(12) United States Patent
Patil et al.

(10) Patent No.: US 7,622,534 B2
(45) Date of Patent: Nov. 24, 2009

(54) EPOXIDATION OF OLEFIN/DIENE COPOLYMERS USING HYDROGEN PEROXIDE

(75) Inventors: Abhimanyu Onkar Patil, Westfield, NJ (US); Karla Schall Colle, Houston, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 159 days.

(21) Appl. No.: 11/606,673

(22) Filed: Nov. 30, 2006

(65) Prior Publication Data

US 2008/0132643 A1    Jun. 5, 2008

(51) Int. Cl.
*C08C 19/06* (2006.01)
*C08F 8/08* (2006.01)

(52) U.S. Cl. .............. 525/332.1; 525/331.9; 525/332.8; 525/387

(58) Field of Classification Search .............. 525/331.9, 525/332.1, 332.8, 387
See application file for complete search history.

(56) References Cited

U.S. PATENT DOCUMENTS 5,155,247 A    10/1992    Herrmann et al.

FOREIGN PATENT DOCUMENTS

| JP | 57-117506 | 7/1982 |
|----|-----------|--------|
| JP | 05-214014 | 8/1993 |
| JP | 2001-031716 | * 2/2001 |

OTHER PUBLICATIONS

Sanford, G., Journal of Fluorine Chemistry 128 (2007) 90-104.*
Neimann et al., Organic Letters 2 (2000) 2861-2863.*
Fuquan Song et al., "Derivatization of Propene/Methyloctadiene Copolymers: A Flexible Approach to Side-Chain-Functionalized Polypropenes", Journal of Polymer Science: Part A: Polymer Chemistry, vol. 40, pp. 1484-1497 (2002).
Jonas Hafren et al., Direct Organocatalytic Polymerization from Cellulose Fibers, Macromolecular Rapid Communications, vol. 26, pp. 82-86 (2005).
Karine Neimann et al., "Electrophilic Activation of Hydrogen Peroxide: Selective Oxidation Reactions in Perfluorinated Alcohol Solvents", Organic Letters, vol. 2, No. 18, pp. 2861-2863 (2000).
Gianluca Soldaini, "Methyltrioxorhenium (MTO)", Synlett Spotlight 96, No. 10, pp. 1849-1850 (2004).
Michiel C. A. van Vliet et al., "Methyltrioxorhenium-catalysed epoxidation of alkenes in trifluoroethanol", Chem. Commun., pp. 821-822 (1999).
Wolfgang A. Herrmann et al., "Methyltrioxorhenium as Catalyst for Olefin Oxidation", Angew. Chem. Int. Ed. Engl. vol. 30, No. 12, pp. 1638-1641 (1991).
Sugata Marathe et al., "Regioselective Copolymerization of 5-Vinyl-2-norbornene with Ethylene Using Zirconocene-Methylaluminoxane Catalysts: A Facile Route to Functional Polyolefins", Macromolecules, vol. 27, pp. 1083-1086 (1994).
Xiaofang Li et al., "Scandium-Catalyzed Copolymerization of Ethylene with Dicyclopentadiene and Terpolymerization of Ethylene, Dicyclopentadiene, and Styrene", Macromolecules, vol. 38, pp. 6767-6769 (2005).
J. Suzuki et al., "Synthesis and Functionalization of Poly(ethylene-co-dicyclopentadiene)", Journal of Applied Polymer Science, vol. 72, pp. 103-108 (1999).
Kamata et al., Efficient, Regioselective Epoxidation of Dienes with Hydrogen Peroxide Catalyzed by $[\gamma\text{-SiW}_{10}\text{O}_{34}(\text{H}^2\text{O})2]^{4-}$, Journal of Catalysis, 2004, vol. 224, No. 1, pp. 224-228.

* cited by examiner

*Primary Examiner*—Roberto Rábago
(74) *Attorney, Agent, or Firm*—Robert L. Adbon

(57) ABSTRACT

A process for preparing an epoxidized α-olefin/diene copolymer including the steps of contacting in a reaction medium a) copolymers of an α-olefin and a diene, which copolymers contain at least one double bond in each diene-derived co-monomer, with b) a hydrogen peroxide epoxidizing agent, in the presence of a perfluorinated alcohol reaction solvent, and in the absence of any metal-containing epoxidation catalyst, under reaction conditions which promote formation of oxirane rings at the sites of the diene-derived co-monomer double bonds in the copolymeric precursor material.

16 Claims, No Drawings

EPOXIDATION OF OLEFIN/DIENE COPOLYMERS USING HYDROGEN PEROXIDE

FIELD OF THE INVENTION

This invention relates to preparation of epoxidized copolymers of α-olefins and dienes. Such epoxidized copolymers can be used as thermally stable, oil resistant polyolefin elastomers if prepared from flexible dienes. Alternatively, such functionalized materials can be used as structural polyolefins if rigid dienes are used to thereby ultimately provide functionalized copolymers of relatively higher glass transition temperatures.

BACKGROUND OF THE INVENTION

Functionalized polyolefin (FPO) materials have potential usefulness for a number of commercial applications. Polyolefins which are reactive or polar can, for example, provide products for major applications, such as high temperature elastomers resistant to oil, and can also provide structural polyolefins. Polyolefins in the form of oil resistant elastomers could compete with chloroprene and nitrile rubber in oil resistant applications but could offer better high temperature performance and service life than ethylene-propylene diene rubbers at a comparable price. Structural polyolefins could be low cost polymeric materials with improved stiffness, strength and use temperatures that would extend the boundary of polyolefins to structural applications, for example, to uses within the automotive area.

Post-polymerization functionalization requires synthesis of precursor olefin copolymers which carry functionalizable "reactive hooks", such as residual double bonds or aromatic rings. Such "reactive hooks" can then be appropriately functionalized using various chemistries.

The present invention concerns utilization of functionalizable copolymer precursors which contain reactive hooks in the form of residual double bonds. Copolymer precursor materials of this type are realized by incorporating a diene co-monomer into the copolymers that can subsequently be functionalized. One of the double bonds in the diene comonomer permits co-polymerization of this co-monomer with one or more α-olefins. The remaining unreacted double bond in each of the pendent co-monomer moieties along the polymer chain is then available for conversion to selected polar groups via a separate process, generally in a different reactor.

This olefin-diene approach allows production of a wide range of products using a single technology. Functionalization of the diene co-monomers within the copolymer precursor permits the introduction of polarity for oil resistance and can also improve the thermal and chemical stability characteristics of the resulting functionalized copolymer materials. Further, glass transition temperature, $T_g$, of the resulting functionalized copolymer can be adjusted by both the choice and content of the diene co-monomer.

One type of known functionalization of olefin/diene copolymers involves reaction of the copolymer precursor material with an oxidizing agent to provide an epoxidized material having oxirane groups formed at the sites of the residual double bonds within the copolymer precursor. Epoxidation of unsaturated materials is a stereospecific reaction, and the rate of epoxidation is governed by the substitutents on the double bond.

Epoxidation of olefin/diene copolymers can be effected by the use of various peroxides and peracids. In the use of peracids, there are two possible procedures, viz., either the peracid is present throughout the reaction or alternatively the peracid is prepared in situ during the reaction. Performic acid prepared in-situ, such as from formic acid and hydrogen peroxide, is very effective as an epoxidizing agent and can be used without catalyst.

While peracid-based epoxidation is effective, there can be environmental and safety concerns associated with the use of peracids. Catalytic epoxidation alternatives using hydrogen peroxide as an oxidizing agent instead of peracids can be used to epoxidize some unsaturated materials. Catalysts based on the use of high valent ($d_o$), mostly Ti, V, Mo, W, and Re, metal complexes are known to promote alkene epoxidation with $H_2O_2$. Some notable effective epoxidation catalysts for use with hydrogen peroxide include titanium silicates, peroxophosphotungstates, manganese triazocyclononane, and methylrhenium trioxide.

As an alternative to peracid-based epoxidation, the catalytic electrophilic activation of hydrogen peroxide with transition metal compounds for the epoxidation reaction of alkenes has, in fact, become a matter of significant interest. And there are a few examples in the art of catalytic oxidation being used to introduce epoxy groups into copolymers containing relatively low levels of unsaturation or unsaturation which is primarily found within the copolymer backbone.

Epoxidation of copolymers having higher levels of pendent unsaturated co-monomers is more difficult than functionalization of non-polymeric alkenes or other types of unsaturated polymers, either with or without use of peracid oxidizing agents or epoxidation catalysts. Such functionalizable copolymers with higher levels of diene-based comonomers have enhanced potential for side reactions and cross-linking which can be brought about by the presence of greater amounts of organic peracids used as epoxidizing agents. Use of an epoxidation catalyst can eliminate the need for the presence of large amounts of acidic reagents and can permit the use of a hydrogen peroxide oxidizing agent instead. But the presence of a metal catalyst can also promote crosslinking or side reactions of the diene-containing copolymer and/or can also potentially degrade the hydrogen peroxide oxidizing agent which is being used along with the catalyst.

Epoxidation of a broad variety of alkenes, including olefin/diene copolymers, is in general known in the art. Representative prior art showing various procedures for epoxidizing a number of types of unsaturated materials includes Hafren et al., *Macromol. Rapid Commun.*, Vol. 26, pp. 82-86 (2005); Song et al., *J. Polym. Sci. Polym. Chem.*, Vol. 40, pp. 1484-1497 (2002); Shigenobu et al. (Maruzen Petrochemical); Japanese Patent Appln. No. JP2001-031716A, published Feb. 26, 2001; Suzuki et al., *Journal of Applied Polymer Science*, Vol. 72, pp. 103-108 (1999); and Li et al.; *Macromolecules*, Vol. 38, pp. 6767-6769 (2005).

Epoxidation of non-polymeric materials using catalysts or selected reaction medium solvents is also in general known in the art. Representative prior art references showing these kinds of expoxidation includes Herrmann et al., *Angew. Chem. Int. Ed. Engl.* Vol. 30, No. 12, pp. 1638-1641 (1991); Van Vliet et al., *Chem. Commun.*, pp. 821-822, (1999); and Neimann et al., *Org. Letters*, Vol. 2, No. 18, pp. 2861-2863 (2000).

Given the actual and potential usefulness of functionalized olefin/diene copolymers—and especially those functionalized by epoxidation—for a variety of commercial applications, it would be desirable to identify especially effective and efficient processes for preparing such epoxidized copolymer materials. Such processes would use relatively mild epoxidation reaction conditions and relatively inexpensive and readily available reaction mixture adjuvants such as reaction solvents. And such processes would desirably be carried out without the need for potentially troublesome peracid oxidizing agents or metal-based epoxidation reaction catalysts.

SUMMARY OF THE INVENTION

In one aspect, the present invention is directed to a process for preparing an epoxidized α-olefin/diene copolymer material. Such a process comprises contacting in a reaction medium a) copolymers of an α-olefin and a diene, which copolymers contain at least one double bond in each diene-derived co-monomer, with b) a hydrogen peroxide epoxidizing agent, under reaction conditions which promote formation of oxirane rings at the sites of the diene-derived co-monomer double bonds. (In one embodiment, these copolymers can comprise an additional type of cyclic mono-olefin comonomers and can thus be terpolymers.) The reaction medium comprises a perfluorinated alcohol reaction solvent and the copolymer and hydrogen peroxide epoxidizing agent are contacted in the absence of any metal-containing epoxidation catalyst.

In another aspect of the invention, the α-olefin is desirably selected from ethylene and propylene, the diene is preferably selected from the group consisting of dicyclopentadiene; ethylidene norbornene; 7-methyl-1, 6-octadiene; 4-vinyl-cyclo-hexene and 1,4-hexadiene, and the preferred perfluorinated alcohol reaction solvent is 1,1,1,3,3,3-hexafluoro-2-propanol.

DETAILED DESCRIPTION OF THE INVENTION

The process of the present invention is carried out by forming a rection medium within which a copolymer of an α-olefin and a diene is contacted with an oxidizing agent under certain reaction conditions to thereby provide the desired epoxidized copolymeric materials. Each of these process elements is described in detail as follows:

A) Copolymeric Precursor

The copolymeric precursor materials which are oxidized in accordance with the process of the invention herein are copolymers comprising at least one α-olefin comonomer and at least one diene-derived comonomer. Accordingly, for purposes of this invention, a "copolymer" is a material which is prepared by copolymerizing at least two different co-monomer types including the essentially present co-monomers derived from α-olefins and dienes. One or more other different co-monomer types may also be included in the copolymers herein such that the copolymer definition includes terpolymers as well as copolymers comprising four or more different comonomer types.

The α-olefin comonomers utilized herein are generally those acyclic unsaturated materials comprising $C_2$ to $C_{12}$ hydrocarbons. Such materials may be linear or branched and have one double bond in the a position. Illustrative non-limiting examples of preferred α-olefins are ethylene, propylene, 1-butene, 1-pentene, 1-hexene, 1-octene and 1-dodecene. Ethylene and propylene are preferred α-olefins with ethylene being most preferred. Combinations of α-olefins may also be used such as a combination of ethylene with 1-octene, 1-hexene and/or 1-butene. The α-olefin(s) will generally be incorporated into the precursor copolymers herein to the extent of from about 5 mole % to about 95 mole %, more preferably from about 55 mole % to about 85 mole %.

A second component of the precursor copolymers used in the oxidation process herein comprises one or more diene-derived comonomers which are copolymerized with the α-olefin comonomers(s). Such dienes may be conjugated or non-conjugated, cyclic or acylic, straight chain or branched, flexible or rigid.

Examples of the suitable conjugated dienes include cyclic conjugated dienes such as 1,3-cyclopentadiene, 1,3-cyclohexadiene, 1,3-cycloheptadiene, 1,3-cyclooctadiene and derivatives thereof, and linear conjugated dienes such as isoprene, 1,3-butadiene, 1,3-pentadiene, 1,3-hexadiene, and 2,3-dimethyl-1,3-butadiene. Such conjugated dienes may be used singly or in a combination of two or more types.

Typical non-limiting examples of non-conjugated dienes useful in the practice of this invention are:

(a) straight chain acyclic dienes such as 1,4-hexadiene and 1,6-octadiene;

(b) branched chain acyclic dienes such as 5-methyl-1,4-hexadiene; 3,7-dimethyl-1,6-octadiene; 3,7-dimethyl-1,7-dioctadiene; and the mixed isomers of dihydromyrcene and dihydro-ocimene;

(c) α,ω-dienes which contain from 7 to 12 carbon atoms including 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like;

(d) single-ring dienes such as: 1,4-cyclohexadiene; 1,5-cyclooctadiene; and 1,5-cyclododecadiene; and (e) multi-ring fixed and fused ring dienes such as: tetrahydroindene; methyltetrahydroindene; dicyclopentadiene (DCPD); bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-(4-cyclopentenyl)-2-norbornene, 5-cyclohexylidene-2-norbornene, and 5-vinyl-2-norbornene (VNB).

When precursor copolymers which are high temperature elastomeric materials resistant to oil are desired, flexible dienes are used to form the precursor copolymers herein. Preferred flexible dienes include 7-methyl-1,6-octadiene; 1,4-hexadiene; and 4-vinyl-1-cyclohexene.

When precursor copolymers which are rigid, structural polyolefins are desired, rigid dienes are used to form the precursor copolymers herein. Preferred rigid dienes include dicyclopentadiene (DCPD); 5-methylene-2-norbornene (MNB), and 5-ethylidene-2-norbornene (ENB). Dicyclopentadiene (DCPD) is the most preferred comonomer used to form the copolymers of the copolymeric precursor component used in this invention.

The diene-derived comonomer will generally be incorporated into the precursor copolymers herein to the extent of from about 1 mole % to about 95 mole %, more preferably from about 15 mole % to about 45 mole %.

The copolymers of the copolymeric precursor component may also optionally comprise additional ancillary comonomers which are neither α-olefins nor dienes. Such optional ancillary comonomers will generally be acyclic, monocyclic or polycyclic mono-olefins containing from 4 to 18 carbon atoms.

Preferred ancillary comonomers are the acyclic monoolefins such as cyclohexene and cyclooctene and the polycylic monolefins such as those described in U.S. Pat. No. 6,627, 714, incorporated herein by reference. Specific examples of such polycylic monolefins include 2-norbornene, 1,4,5,8-dimethano-1,2,3,4,4a,5,8,8a-octahydronaphthalene, 5-methyl-2-norbornene, 5-ethyl-2-norbornene, 5-propyl-2-norbornene, 5-phenyl-2-norbornene, 5-benzyl-2-norbornene, 5-chloro-2-norbornene, 5-fluoro-2-norbornene, 5-chloromethyl-2-norbornene, 5-methoxy-2-norbornene, 7-methyl-2-norbornene, 5-isobutyl-2-norbornene, 5,6-dimethyl-2-norbornene, 5,5-dichloro-2-norbornene, 5,5,6-trimethyl-2- norbornene, 5,5,6-trifluoro-6-trifluoromethylnorbornene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene and 2,3-dimethyl-1,4,5,8-dimethano-1,2,3,4,4a,5,8,8a-octahydronaphthalene. The most preferrred opotional ancillary comonomers for use in preparing the precursor copolymers are 2-norbornene and 5-methyl-2-norbornene.

The introduction of a third type of ancillary comonomer into the precursor copolymers used herein permits one to adjust the thermal, optical or rheological characteristics (such as glass transition temperature) of these precursor copolymers independently of the extent of functional characteristics of the copolymers introduced via epoxidation of the residual double bonds of the diene-derived comonomers. The resulting copolymer materials containing these ancillary commoners are can thus be characterized as terpolymers comprising three distinct types of comonomers within their polymer structure. If utilized, the optional ancillary comonomers will generally comprise from about 5 mole % to about 85 mole %, more preferably from about 10 mole % to about 80 mole %, of the precursor copolymers used in the oxidation processes herein.

For precursor copolymers which are formed from rigid dienes (and optionally also rigid ancillary comonomers), the copolymeric precursor component of the present invention will generally have a weight average molecular weight, $M_w$, of from about 170,000 g/mol to about 1,000,000 g/mol, as measured versus polystyrene standards by Gel Permeation Chromatography analysis. More preferably, the rigid precursor copolymers used herein will have an $M_w$ of greater than about 175,000, even more preferably greater than about 180,000, most preferably greater than about 200,000 g/mol. As noted, weight average molecular weight for these copolymer materials can be determined in standard fashion using Gel Permeation Chromatography.

Functionalization of the copolymeric precursors, of course, adds oxygen-containing moieties to the resulting functionalized copolymers. Such functionalization thus tends to increase the molecular weight of the functionalized copolymers in comparison with the copolymeric precursor material. The extent of molecular weight increase tends to be larger for copolymer material containing higher levels of the diene-derived comonomers and higher levels of functionalization.

The precursor copolymer materials used in the present invention will preferably comprise amorphous materials. As used herein, an amorphous polymer is defined to be a polymeric material having no crystalline component, as evidenced by no discernible melting temperature ($T_m$) in its second heat Differential Scanning Calorimetry (DSC) spectrum, or a polymeric material having a crystalline component that exhibits a second heat DSC $T_m$ with a heat of fusion ($\Delta H_f$) of less than 0.50 J/g.

The precursor copolymers used herein will preferably have certain glass transition temperature ($T_g$) characteristics. A simplistic view of the glass transition temperature of a polymeric material is the temperature below which molecules therein have very little mobility. On a larger scale, polymers are rigid and brittle below their glass transition temperature and can undergo plastic deformation above it. $T_g$ is usually applicable to amorphous phases such as are preferably present in the precursor copolymers used in the present invention.

As noted, the glass transition temperature of the precursor copolymers used herein is related to the softening point of these materials and can be measured via a variety of techniques as discussed in INTRODUCTION TO POLYMER SCIENCE AND TECHNOLOGY: AN SPE TEXTBOOK, by H. S. Kaufman and J. Falcetta, John Wiley & Sons, 1977, and POLYMER HANDBOOK by J. Brandup and E. H. Immergut, editors, John Wiley & Sons, 1989. The DSC techniques utilized in connection with the present invention are well known in the art and are described hereinafter in the Test Methods section.

For epoxidized, rigid diene-containing polyolefin materials which are to be prepared by the process herein and which are to be used as structural polyolefins, the glass transition temperature, $T_g$, of the copolymeric precursor component should range from about 85° C. to about 210° C., more preferably from about 100° C. to about 200° C. At such $T_g$ values, these materials can suitably be used as engineering thermoplastics. Higher $T_g$s are generally realized by using rigid dienes such as dicyclopentadiene (and by using generally higher amounts of such rigid dienes) in the precursor copolymers.

For epoxidized, flexible diene-containing polyolefin materials which are to be prepared by the processes herein and which are to be used as elastomeric polyolefins, the glass transition temperature, $T_g$, of the copolymeric precursor component should range from about −80° C. to about 0° C., more preferably from about −60° C. to about −10° C. At such $T_g$ values, these materials can suitably be used as elastomeric thermoplastics which are resistant to oil and high temperature conditions. These lower $T_g$s are generally realized by using flexible dienes such as 7-methyl-1,6-octadiene (and by using generally lower amounts of such flexible dienes) in the precursor copolymers.

The precursor copolymers used in the oxidation process of this invention can be produced via a conventional polymerization reaction. Such a reaction takes place by contacting the requisite α-olefin such as ethylene with a polymerization mixture containing the requisite diene and any optional ancillary comonomers. This polymerization reaction is promoted by a suitable polymerization catalyst or catalyst system and can take place under a conventional set of polymerization reaction conditions. Aliphatic and aromatic hydrocarbons such as hexane, pentane, isopentane, cyclohexane, octane, toluene, xylene, and the like may be suitably used as a diluent or solvent for the polymerization mixture. The polymerization mixture will generally be in liquid or mixed liquid/solid form during the polymerization reaction carried out therein.

Any conventional type of polymerization process may be used to produce the precursor copolymers used in this invention. Polymerization methods include high pressure, slurry, bulk, suspension, supercritical, or solution phase, or a combination thereof. Preferably solution phase or bulk phase polymerization processes are used.

A wide variety of transition metal compounds, e.g., Ziegler-Natta catalysts and metallocenes, are known which, when activated with a suitable activator, will polymerize olefinic monomers to produce the precursor copolymers to be used in the instant oxidation process. Metallocene catalysts are preferred. A full discussion of such metallocene catalysts and catalyst systems can be found in PCT Patent Publication No. WO 2004/046214, published Jun. 3, 2004, the entire contents of which are incorporated herein by reference.

The copolymeric precursor compounds formed by copolymerizing α-olefins, dienes and optionally other comonomers are generally recovered and separated from the polymerization reaction mixtures within which they are made, prior to their oxidation in accordance with the process of this invention. Copolymeric precursor recovery and separation can be carried out by conventional means, such as by adding to the polymerization mixture a solvent such as methanol in which the copolymeric precursor material is insoluble. This results in precipitation of the copolymeric precursor material, which can then be recovered by conventional filtration techniques.

B) Hydrogen Peroxide Epoxidizing Agent

In accordance with the present invention, the copolymeric precursor material containing residual unsaturation is converted to the desired epoxidized polyolefin product by reacting the copolymeric precursor component with a selected type of epoxidizing agent which is hydrogen peroxide. Hydrogen peroxide has the chemical formula $H_2O_2$ and is a strong oxidizing agent. It is a raw material which is readily commercially available in a variety of forms.

Hydrogen peroxide is preferably used in the process herein in the form of an aqueous solution with a hydrogen peroxide content of from about 1 wt % to 90 wt %, more preferably from about 10 wt % to 80 wt % and even more preferably from about 30 wt % to 70 wt %. The hydrogen peroxide may be used in the form of a commercially available, stabilized solution. Suitable sources of peroxide are unstabilized, aqueous hydrogen peroxide solutions such as are obtained in the anthraquinone process for producing hydrogen peroxide. Hydrogen peroxide solutions in methanol which are obtained by reacting hydrogen and oxygen in the presence of a noble metal catalyst in a methanol solvent may also be used.

C) Reaction Medium

The epoxidation reactions of the process of the present invention are carried out in a suitable reaction medium which will generally be a liquid reaction medium. The reaction medium can comprise only the reactants essentially utilized in the process herein. More conventionally, however, the liquid reaction medium will generally comprise a suitable reaction solvent in which the reactants can be dissolved, suspended or dispersed. (For purposes of the present invention, a liquid which does not participate in the reaction and which forms the reaction medium is referred to herein as a "reaction solvent" even though not all of the materials within the reaction medium will necessarily be completely dissolved in or miscible with such a liquid.)

Suitable reaction solvents include organic liquids which are inert in the reaction mixture. By "inert" as used herein in conjunction with reaction solvents is meant that the solvent does not deleteriously affect the epoxidation reaction relative to its absence and does not increase the formation of non-epoxidized products.

Such suitable inert organic solvents include aromatic hydrocarbons such as benzene, toluene, xylene, benzonitrile, nitrobenzene, adiponitrile, anisole, phenyl nonane; saturated aliphatic hydrocarbons having from about 5 to about 20 carbons, such as pentane, hexane, heptane adiponitrile; halogenated hydrocarbons such as methylene chloride, 1,2-dichloroethane, chloroform, carbon tetrachloride and the like; non-fluorinated, substituted saturated aliphatic and/or aromatic hydrocarbons having from about 1 to about 20 carbons including those selected from the group consisting of alcohols such as: methanol, propanol, butanol, isopropanol, 2,4-di-t-butyl phenol; ketones such as acetone; carboxylic acids such as propanoic acid, acetic acid; esters such as ethyl acetate, ethyl benzoate, dimethyl succinate, butyl acetate, tri-n-butyl phosphate; dimethyl phthalate; and ethers, such as tetraglyme; and mixtures thereof.

Preferred organic solvents include $C_1$-$C_4$ halogenated hydrocarbons. Carbon tetrachloride, methylene chloride, chloroform and trichloroehtylene are especially preferred.

The reaction medium may also comprise water. Water, for example, may be introduced as a carrier for the $H_2O_2$ oxidizing agent.

In accordance with the present invention, it has been found that incorporation of a perfluorinated alcohol reaction solvent in the reaction medium, in the absence of any metal or non-metal catalysts, allows epoxidation of α-olefin/diene copolymers. It is believed that the strong electron-withdrawing properties of fluorine along with the hydrogen bonding properties of the O—H hydrogen atom lead to the formation of an electrophilically activated hydrogen peroxide intermediate. The perfluorinated alcohol reaction solvent content in the reaction medium is about from about 20 wt % to 100 wt %, more preferably from about 30 wt % to 80 wt % and even more preferably from about 25 wt % to 90 wt %.

Most desirably, the perfluorinated alcohol reaction solvent is 1,1,1,3,3,3-hexafluoro-2-propanol. However, the perfluorinated alcohol reaction solvent may usefully be selected from the group consisting of hexafluoroisopropanol, tetrafluoropropanol, pentafluoropropanol, hexafluorophenylpropanol, perfluorobutyl alcohol, octafluoropentanol, hexafluor-2-propanol, pentafluoro-1-propanol, tetrafluorophenol, trifluorophenol, difluorophenol, tetrafluoro-1-propanol, 4-(trifluoromethyl)benzyl alcohol, 2,2,2-trifluoroethanol, 2,4,5-trifluorophenol, 2,4-difluorobenzyl alcohol, 2,4-difluorophenol, 4-fluorobenzyl alcohol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-perfluor-3-methylbutyl)ethanol, 1H,1H,3H-tetrafluoro-1-propanol, 1H,1H,5H-octafluoro-1-pentanol, 1H,1H,7H-dodecafluoro-1-heptanol, 1H,1H,9H-hexadecafluoro-1-nonanol, 2H-hexafluoro-2-propanol, 1H,1H,3H-hexafluoro-2-butanol.

D) Reaction Conditions

In one aspect of the present invention, the unsaturated α-olefin/diene copolymers as hereinbefore described are converted using the oxidizing agent to epoxidize copolymers by subjecting the reaction medium containing these reactants to reaction conditions which convert from about 10% to 100% of the double bonds in the diene-derived comonomers to oxirane groups. Certain types and concentrations of reactants, as well as relatively lower reaction temperatures and relatively shorter reaction times, tend to favor conversion of the unsaturated copolymers to epoxidized copolymers.

For epoxidation, the initial concentration of the unsaturated copolymers to be functionalized will generally range from about 0.5 wt % to about 40 wt % within the reaction medium. More preferably, the initial concentration of unsaturated copolymers to be functionalized will range from about 1 wt % to about 20 wt %, most preferably from about 2 wt % to about 10 wt %.

The initial concentration of the hydrogen peroxide oxidizing agent, for epoxidization, will generally range from about 1 to about 100 moles of hydrogen peroxide oxidizing agent for every mole of olefinic carbon-carbon double bonds within the copolymer to be subjected to oxidation. More prefrably, from about 1.05 to about 10 moles of $H_2O_2$ are added to the reaction medium per mole of unsaturated copolymer double bonds in the precursor copolymers.

Olefin/diene copolymers containing comonomers derived from both flexible dienes and rigid dienes, and also optionally from ancillary olefinic terpolymer-forming comonomers, can be oxidized to epoxidized copolymers by using relatively mild reaction temperatures and relatively short reaction times. For the epoxidation embodiments of the present process, temperature of the reaction medium will generally range from about 20° C. to about 100° C., more preferably from about 25° C. to about 50° C. For production of epoxidized copolymeric materials, reaction times will generally range from about 0.1 to about 72 hours, more preferably from about 0.5 to about 36 hours.

The epoxidized olefin/diene copolymers produced by the processes herein can be recovered from the reaction medium using any conventional recovery or separation techniques (e.g., precipitation/filtration). Spectroscopic analytical techniques (IR and NMR) can be used to determine the nature and extent of functionalization within the recovered copolymer product.

Such functionalized olefin/diene copolymers retain many of the beneficial thermal, rheological and mechanical properties of the precursor unsaturated copolymers. Epoxidation generally increases the glass transition temperature, $T_g$, of the copolymer and imbues polarity which imparts oil resistance. Functionalization thus provides a different balance between properties, cost, and processing range, and can make the resulting materials especially useful as oil resistant, thermally stable elastomers or as structural engineering thermoplastics or precursors thereof.

Test Methods and Analytical Procedures

The various parameters and properties used to characterize the polymeric materials described herein can be determined using conventional or well known analytical or testing methodology, procedures and apparatus. For purposes of determining values for the parameters and characteristics provided for the materials of this invention, the following methods and procedures are employed.

Gel Permeation Chromatography (GPC) molecular weights for copolymers reported versus polystyrene are determined using a Waters Associates 2000 Gel Permeation Chromatograph equipped with three Polymer Laboratories mixed bed high-porosity Type LS B columns (10 µm particle size, 7.8 mm inner diameter, 300 mm length) and an internal Waters differential refractive index (DRI) detector. The mobile phase is 1,2,4-trichlorobenzene (degassed and inhibited with 1.5 g/L of 2,6-di-t-butyl-4-methylphenol) at 135° C. (flow rate 1.0 mL/min; typical sample concentration 1.0 mg/mL; 301.5 µL injection loop). Alternately, a Waters Associates 150° C. High Temperature Gel Permeation Chromatograph equipped with three Polymer Laboratories mixed bed high-porosity Type B columns (of similar dimensions) and an internal DRI detector can be used. The mobile phase is 1,2, 4-trichlorobenzene at 145° C. (flow rate 0.5 mL/min; typical sample concentration 1-2 mg/mL). The DRI signal for EDCPD copolymers exhibits inverted polarity from the signal for homo-polyethylene. Polystyrene standards (17 in total) are used for instrument calibration.

DSC data used to determine thermal properties of copolymers are obtained on a TA Instruments model 2920 or 2910 calorimeter using a scan rate of 10 degrees per minute, typically from −40° C., 25° C., or 50° C. to ≧190° C. (preferably to 250° C.). Some samples are analyzed to 300° C. on the second heat; some epoxy-EDCPD copolymers are analyzed from low temperature (−110 or −125° C.) to 250° C. $T_g$ midpoint values and $T_m$ maximum values reported are from the second heat.

Infrared (IR) spectrometric analysis of copolymers is carried out on thin films which are either compression molded or cast from $CHCl_3$ (epoxy-EDCPDs) onto NaCl disks, using a ThermoNicolet Nexus 470 spectrometer running OMNIC software.

Solution $^{13}C\{^1H\}$ NMR spectra of polymers are collected in $d_2$-TCE at 120° C. on a Varian UnityPlus 500 spectrometer equipped with a 10 mm broadband probe or a Varian Inova 300 spectrometer equipped with a 10 mm broadband probe. $Cr(acac)_3$ (~15 mg/mL) is used as a relaxation agent.

$^1H$ NMR mol % composition for EDCPD copolymers is determined by integrating the olefin resonances (5.6 and 5.5 ppm, total 2H) and optionally the allylic bridgehead resonance (3.1 ppm, 1H), the non-allylic bridgehead resonance (2.5 ppm, 1H), and the cyclopentenyl $CH_2$ and chain CH resonances (2.2-1.9 ppm, total 4H, when resolved). After correcting the rest of the aliphatic region for DCPD content, the remainder of the aliphatic integral is assigned to ethylene; no corrections are made for cyclohexane solvent. Residual solvent is estimated in weight percent by integrating the cyclohexane peak at 1.4 ppm (overlapped) versus the total polymer integral. When reported, toluene and residual DCPD monomer contents are calculated using, respectively, the toluene aryl resonances (7.15-7.05 ppm, 5H) and resolved DCPD monomer resonances (norbornene olefin peak just upfield of 6.0 ppm, 1H; 3.25 ppm allylic bridgehead peak, 1H; non-allylic bridgehead and cyclopentenyl $CH_2$, 2.95-2.7 ppm, 3H). The aliphatic integral is also optionally corrected for toluene and DCPD monomer.

$^1H$ NMR mol % composition and percent functionalization for epoxy-EDCPD copolymers is determined by integrating the epoxy-DCPD CHO resonances (3.4 and 3.3 ppm, total 2H, plus optionally the bridgehead resonances at 2.4 and 2.3 ppm, 2H), any remaining DCPD resonances (olefins at 5.6 and 5.5 ppm, total 2H, and optionally the allylic bridgehead peak at 3.1 ppm, 1H), and any signals from formate hemiester units ([—CH(OH)CH(OC(=O)H)—] units; 8.1-8.0 ppm (CH(OC(=O)H), 1H) and 5.0 ppm (CH(OC(=O)H), 1H)). After correcting the rest of the aliphatic region for epoxy-DCPD, DCPD, and formate hemiester content, the remainder of the aliphatic integral is assigned to ethylene. Ring-opened diol-DCPD units ([—CH(OH)CH(O)H]—] units), when present, are quantified versus epoxy-DCPD units by $^{13}C$ NMR using the CHOH resonance at 76-80 ppm (2 C; after correction for 2 C of formate hemiester [—CH(OH)CH(OC(=O)H)—] unit, if present) versus the epoxy-DCPD CHO resonances (61.2 and 60.1 ppm, 2 C).

All patents and patent applications, test procedures (such as ASTM methods), and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

In another embodiment, this invention relates to:

1. A process for preparing an epoxidized α-olefin/diene copolymer material, which process comprises contacting in a reaction medium a) copolymers of an α-olefin and a diene, which copolymers contain at least one double bond in each diene-derived co-monomer, with b) a hydrogen peroxide epoxidizing agent, under reaction conditions which promote formation of oxirane rings at the sites of the diene-derived co-monomer double bonds, wherein said reaction medium comprises a perfluorinated alcohol reaction solvent; and said contacting of copolymer and hydrogen peroxide epoxidizing agent is carried out in the absence of any metal-containing epoxidation catalyst.

2. A process according to paragraph 1 wherein said α-olefin is selected from the group consisting of ethylene and propylene.

3. A process according to paragraphs 1 or 2 wherein said diene is selected from the group consisting of dicyclopentadiene; ethylidene norbornene; 7-methyl-1,6-octadiene; 4-vinyl-cyclohexene; and 1,4-hexadiene.

4. A process according to any of paragraphs 1 to 3 wherein said α-olefin comprises a combination of ethylene with another α-olefin selected from the group consisting of 1-octene, 1-hexene and/or 1-butene.

5. A process according to any of paragraphs 1 to 4 wherein said copolymer material comprises ethylene/dicylopentadiene copolymers.

6. A process according to any of paragraphs 1 to 5 wherein said copolymeric precursor component comprises terpolymers of α-olefins, dienes and ancillary comonomers which are not α-olefins and which are selected from the group consisting of acyclic, monocyclic and polycyclic mono-olefins containing from about 4 to 18 carbon atoms.

7. A process according to paragraph 6 wherein said ancillary comonomers are selected from the group consisting of 2-norbornene and 5-methyl-norbornene.

8. A process according to paragraph 5 wherein said epoxidized ethylene/dicyclopentadiene copolymer material has
a dicyclopentadiene content of from about 15 mol % to about 45 mol %;
a weight average molecular weight, $M_w$, of from about 170,000 to about 1,000,000; and
a glass transition temperature, $T_g$, of from about 85° C. to about 210° C.

9. A process according to any of paragraphs 1 to 8 wherein said perfluorinated alcohol reaction solvent is selected from the group consisting of hexafluoroisopropanol, tetrafluoropropanol, pentafluoropropanol, hexafluorophenylpropanol, perfluorobutyl alcohol, octafluoropentanol, hexafluor-2-propanol, pentafluoro-1-propanol, tetrafluorophenol, trifluorophenol, difluorophenol, tetrafluoro-1-propanol, 4-(trifluoromethyl)benzyl alcohol, 2,2,2-trifluoroethanol, 2,4,5-trifluorophenol, 2,4-difluorobenzyl alcohol, 2,4-difluorophenol, 4-fluorobenzyl alcohol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-perfluor-3-methylbutyl)ethanol, 1H,1H,3H-tetrafluoro-1-propanol, 1H,1H,5H-octafluoro-1-pentanol, 1H,1H,7H-dodecafluoro-1-heptanol, 1H,1H,9H-hexadecafluoro-1-nonanol, 2H-hexafluoro-2-propanol, 1H,1H,3H-hexafluoro-2-butanol.

10. A process according to paragraph 9 wherein said perfluorinated alcohol reaction solvent is 1,1,1,3,3,3-hexafluoro-2-propanol.

11. A process according to any of paragraphs 1 to 10 wherein said reaction medium comprises an organic reaction co-solvent.

12. A process according to paragraph 11 wherein said reaction medium comprises from about 20 wt % to about 100 wt % of said perfluorinated alcohol reaction solvent.

13. A process according to paragraph 12 wherein said organic reaction co-solvent comprises $C_1$-$C_4$ halogenated hydrocarbons.

14. A process according to paragraph 13 wherein said reaction co-solvent is selected from carbon tetrachloride, methylene chloride, chloroform and trichloroethylene.

15. A process according to any of paragraphs 1 to 14 wherein said reaction conditions are sufficient to effect oxirane formation at from about 10% to 100% of the double bonds within said ethylene/dicyclopentadiene copolymer material.

16. A process according to paragraph 15 wherein said olefin/diene copolymer material is initially present in said reaction medium at a concentration of from about 0.01 wt % to about 20 wt %; and said hydrogen peroxide epoxidizing agent is initially present in said reaction medium at a concentration of from about 1.05 to about 5.0 molar.

17. A process according to paragraph 15 wherein said epoxidation reaction conditions include a reaction medium temperature of from about 20° C. to about 100° C. and a reaction time of from about 0.5 to about 36 hours

EXAMPLES

The preparation and characterization of a number of epoxidized olefin-diene copolymers, including terpolymers, in accordance with the process of this invention can be illustrated by the following Examples: (In these Examples, the molar concentrations given are per mole of double bonds within the unsaturated copolymeric precursor component.)

Example 1

Epoxidation of E/DPCD Copolymer with Hydrogen Peroxide in 1,1,1,3,3,3-Hexafluoro-2-Propanol in the Absence of Catalyst Initially 0.5 g E/DCPD containing 45.7 mole % DCPD (FW 132.2, bp 170° C., 0.00302 moles) is charged into a round bottom flask and is dissolved in 25 ml chloroform (2% polymer solution). To this solution is added 0.685 g (FW 34.02, X2, 0.00604 moles) of 30% hydrogen peroxide and 5 g of 1,1,1,3,3,3-hexafluoro-2-propanol. The solution is heated and stirred at 70° C. for 18 hours. Thereafter, the product is precipitated, filtered and washed with methanol and dried in vacuum at 70° C. for 24 hours. The IR spectrum of the product shows the absorption peak at 835 $cm^{-1}$, a characteristic peak of E/DCPD epoxide and a decrease in absorption peaks due to double bond peaks at 1610, 1103, and 945 $cm^{-1}$. The $^{13}C$ NMR spectrum of the product suggests that 24 mole % of the DCPD double bonds are epoxidized. Thus, this spectroscopic data (NMR and IR) show that epoxidation of E/DCPD can be carried out using hydrogen peroxide in 1,1,1,3,3,3-hexafluoro-2-propanol solvent without addition of any metal catalyst.

Example 2

Epoxidation of E/O/VCH Copolymer with Hydrogen Peroxide in 1,1,1,3,3,3-Hexafluoro-2-Propanol in the Absence of Catalyst Initially, 0.5 g of ethylene/1-octene/4-vinyl-1-cyclohexene copolymer (E/O/VCH) containing about 13.8 mole % VCH (FW 108.18, 0.0006 moles) is charged into a reaction flask and is dissolved in 25 ml of chloroform. To this solution are added 0.544 g 0.136 g (FW 34.02, X8, 0.0048 moles) of 30% hydrogen peroxide and 10 g of 1,1,1,3,3,3-hexafluoro-2-propanol. The solution is heated and stirred at 70° C. for 36 hours. The product is precipitated in acetone. The solid product is then filtered, washed with acetone and dried under vacuum at 70° C. for 24 hours. The IR spectrum of the starting terpolymer shows the cyclic double bond peaks at 1653 and 910 $cm^{-1}$. On epoxidation, the double bond peak decreases in intensity and new peaks due to epoxidized copolymer at 976, 850, and 798 cm$^{-1}$ appear in the product.

Example 3

Epoxidation of E/MOD Copolymer with Hydrogen Peroxide in 1,1,1,3,3,3-Hexafluoro-2-Propanol in the Absence of Catalyst Initially, 0.5 g of ethylene/7-methyl-1,6-octadiene copolymer (E/MOD), Mn 51K, M$_w$ 122K, Tg-56) containing about 10.2 mole % MOD (FW 124.23, 0.0013 moles) is charged into a reaction flask and is dissolved in 10 ml of chloroform. To this solution are added 1.53 g (FW 34.02, X10, 0.013 moles) of 30% hydrogen peroxide and 2 g of 1,1,1,3,3,3-hexafluoro-2-propanol. The solution is heated and stirred at 70° C. for 36 hours. The product is precipitated in acetone. The solid product is then filtered, washed with acetone and dried under vacuum at 70° C. for 24 hours. The IR spectra of the starting copolymer shows a double bond peak at 1673 cm$^{-1}$ due to a 6,7 pendant double bond in the copolymer. On epoxidation, the double bond peak decreases in intensity and new peaks due to epoxidized copolymer at 1120 and 895 cm$^{-1}$ appear in the product.

What is claimed is:

1. A process for preparing an epoxidized α-olefin/diene copolymer material, which process comprises contacting in a reaction medium a) copolymers of an α-olefin and a diene, which copolymers contain at least one double bond in each diene-derived co-monomer, with b) a hydrogen peroxide epoxidizing agent, under reaction conditions which promote formation of oxirane rings at the sites of the diene-derived co-monomer double bonds, wherein
   a) said reaction medium comprises a reaction solvent selected from the group consisting of:
   1,1,1,3,3,3-hexafluoro-2-propanol, hexafluoroisopropanol, tetrafluoropropanol, pentafluoropropanol, hexafluorophenylpropanol, perfluorobutyl alcohol, octafluoropentanol, hexafluor-2-propanol, pentafluoro-1-propanol, tetrafluorophenol, trifluorophenol, difluorophenol, tetrafluoro-1-propanol, 4-(trifluoromethyl) benzyl alcohol, 2,2,2-trifluoroethanol, 2,4,5-trifluorophenol, 2,4-difluorobenzyl alcohol, 2,4-difluorophenol, 4-fluorobenzyl alcohol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-perfluor-3-methylbutyl) ethanol, 1H,1H,3H-tetrafluoro-1-propanol, 1H,1H,5H-octafluoro-1-pentanol, 1H,1H,7H-dodecafluoro-1-heptanol, 1H,1H,9H-hexadecafluoro-1-nonanol, 2H-hexafluoro-2-propanol, 1H,1H,3H-hexafluoro-2-butanol; and
   b) said contacting of copolymer and hydrogen peroxide epoxidizing agent is carried out in the absence of any metal-containing epoxidation catalyst.

2. A process according to claim 1, wherein said α-olefin is selected from the group consisting of ethylene and propylene.

3. A process according to claim 1, wherein said diene is selected from the group consisting of dicyclopentadiene; ethylidene norbornene; 7-methyl-1, 6-octadiene; 4-vinyl-cyclohexene; and 1,4-hexadiene.

4. A process according to claim 1, wherein said α-olefin comprises a combination of ethylene with another α-olefin selected from the group consisting of 1-octene, 1-hexene and/or 1-butene.

5. A process according to claim 1, wherein said copolymer material comprises ethylene/dicyclopentadiene copolymers.

6. A process according to claim 1, wherein said copolymeric precursor component comprises terpolymers of α-olefins, dienes and ancillary comonomers which are not α-olefins and which are selected from the group consisting of acyclic, monocyclic and polycyclic mono-olefins containing from about 4 to 18 carbon atoms.

7. A process according to claim 6, wherein said ancillary comonomers are selected from the group consisting of 2-norbornene and 5-methyl-norbornene.

8. A process according to claim 5, wherein said epoxidized ethylene/dicyclopentadiene copolymer material has
   a) a dicyclopentadiene content of from about 15 mol % to about 45 mol %;
   b) a weight average molecular weight, M$_w$, of from about 170,000 to about 1,000,000; and
   c) a glass transition temperature, T$_g$, of from about 85° C. to about 210° C.

9. A process according to claim 1, wherein said reaction solvent is 1,1,1,3,3,3-hexafluoro-2-propanol.

10. A process according to claim 1, wherein said reaction medium comprises an organic reaction co-solvent.

11. A process according to claim 10, wherein said reaction medium comprises from about 20 wt % to about 100 wt % of said reaction solvent.

12. A process according to claim 11, wherein said organic reaction co-solvent comprises C$_1$-C$_4$ halogenated hydrocarbons.

13. A process according to claim 12, wherein said reaction co-solvent is selected from carbon tetrachloride, methylene chloride, chloroform and trichloroethylene.

14. A process according to claim 5, wherein said reaction conditions are sufficient to effect oxirane formation at from about 10% to 100% of the double bonds within said ethylene/dicyclopentadiene copolymer material.

15. A process according to claim 14, wherein said olefin/diene copolymer material is initially present in said reaction medium at a concentration of from about 0.01 wt % to about 20 wt %; and said hydrogen peroxide epoxidizing agent is initially present in said reaction medium at a concentration of from about 1.05 to about 5.0 molar.

16. A process according to claim 14, wherein said epoxidation reaction conditions include a reaction medium temperature of from about 20° C. to about 100° C. and a reaction time of from about 0.5 to about 36 hours.

* * * * *